(12) United States Patent
Yamaguchi

(10) Patent No.: US 10,941,768 B2
(45) Date of Patent: Mar. 9, 2021

(54) DRIVE DEVICE

(71) Applicant: Nidec Corporation, Kyoto (JP)

(72) Inventor: Yasuo Yamaguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 88 days.

(21) Appl. No.: 16/323,641

(22) PCT Filed: Aug. 8, 2017

(86) PCT No.: PCT/JP2017/028693
§ 371 (c)(1),
(2) Date: Feb. 6, 2019

(87) PCT Pub. No.: WO2018/030375
PCT Pub. Date: Feb. 15, 2018

(65) Prior Publication Data
US 2019/0170140 A1 Jun. 6, 2019

Related U.S. Application Data

(60) Provisional application No. 62/372,411, filed on Aug. 9, 2016, provisional application No. 62/402,027, filed
(Continued)

(30) Foreign Application Priority Data

Mar. 31, 2017 (JP) ................................. 2017-071397

(51) Int. Cl.
*F04C 2/10* (2006.01)
*F04C 15/00* (2006.01)
(Continued)

(52) U.S. Cl.
CPC ................ *F04C 2/10* (2013.01); *F04C 2/102* (2013.01); *F04C 2/103* (2013.01); *F04C 13/002* (2013.01);
(Continued)

(58) Field of Classification Search
CPC .. F04C 2/10; F04C 2/102; F04C 2/103; F04C 13/002; F04C 13/005; F04C 15/0088
See application file for complete search history.

(56) References Cited

U.S. PATENT DOCUMENTS 6,039,551 A 3/2000 Takeuchi et al.
6,116,877 A 9/2000 Takeuchi et al.
(Continued)

FOREIGN PATENT DOCUMENTS

CN 102472271 A 5/2012
CN 105114302 A 12/2015
(Continued)

OTHER PUBLICATIONS

Yamaguchi et al., "Drive Device", U.S. Appl. No. 16/323,643, filed Feb. 6, 2019.
(Continued)

*Primary Examiner* — Patrick Hamo
(74) *Attorney, Agent, or Firm* — Keating & Bennett

(57) ABSTRACT

A drive device includes a rotor, a stator, a housing including an accommodation portion to store oil, and a pump driven through a motor shaft. The pump includes an external gear fixed to an end on one side in an axial direction of the motor shaft, an internal gear surrounding a radial outside of the external gear and meshing with the external gear, a pump room accommodating the internal gear and the external gear, a suction port through which the oil is to be sucked into the pump room, and a discharge port through which the oil is to be discharged from the pump room. The housing includes an outer lid in which the pump room is provided. The outer lid includes a shaft insertion hole that penetrates the outer lid from a surface on the other side in the axial direction of the pump room to a surface on the other side in the axial direction of the outer lid, the motor shaft being inserted into the shaft insertion hole, and a support defining at least a
(Continued)

portion of the surface on the other side in the axial direction of the pump room and at least a portion of a radially inside surface of the shaft insertion hole. The support journals the motor shaft on the radial outside of the motor shaft.

9 Claims, 5 Drawing Sheets

Related U.S. Application Data on Sep. 30, 2016, provisional application No. 62/439,201, filed on Dec. 27, 2016.

(51) Int. Cl.

| | |
|---|---|
| *F04C 13/00* | (2006.01) |
| *F04C 15/06* | (2006.01) |
| *H02K 5/20* | (2006.01) |
| *H02K 7/00* | (2006.01) |
| *H02K 9/19* | (2006.01) |
| *F16K 17/04* | (2006.01) |
| *F16N 1/00* | (2006.01) |
| *F16N 7/40* | (2006.01) |
| *F16N 13/20* | (2006.01) |
| *H02K 9/193* | (2006.01) |
| *H02K 11/225* | (2016.01) |
| *H02K 7/14* | (2006.01) |
| *H02K 1/12* | (2006.01) |
| *H02K 1/22* | (2006.01) |

(52) U.S. Cl.
CPC ........ *F04C 13/005* (2013.01); *F04C 15/0088* (2013.01); *F04C 15/0096* (2013.01); *F04C 15/06* (2013.01); *F16K 17/04* (2013.01); *F16K 17/0406* (2013.01); *F16N 1/00* (2013.01); *F16N 7/40* (2013.01); *F16N 13/20* (2013.01); *H02K 5/20* (2013.01); *H02K 7/003* (2013.01); *H02K 7/14* (2013.01); *H02K 9/19* (2013.01); *H02K 9/193* (2013.01); *H02K 11/225* (2016.01); *F04C 2210/14* (2013.01); *F04C 2280/02* (2013.01); *F16N 2210/18* (2013.01); *F16N 2280/00* (2013.01); *H02K 1/12* (2013.01); *H02K 1/22* (2013.01)

(56) References Cited

U.S. PATENT DOCUMENTS

| | | | |
|---|---|---|---|
| 6,227,828 B1 | 5/2001 | Takeuchi et al. | |
| 7,211,913 B2 | 5/2007 | Tsutsui et al. | |
| 7,278,841 B2 * | 10/2007 | Phillips | F04C 2/086 418/132 |
| 7,828,095 B2 | 11/2010 | Murata et al. | |
| 8,734,140 B2 * | 5/2014 | Wilton | F04C 2/102 418/166 |
| 9,441,628 B2 | 9/2016 | Sakata et al. | |
| 9,762,106 B2 | 9/2017 | Gauthier et al. | |
| 2004/0200350 A1 | 10/2004 | Makino et al. | |
| 2007/0178292 A1 | 8/2007 | Hasegawa et al. | |
| 2012/0128513 A1 | 5/2012 | Sakata et al. | |
| 2013/0145879 A1 | 6/2013 | Nakamura et al. | |
| 2013/0149181 A1 * | 6/2013 | Jingzhi | F04C 15/064 418/166 |
| 2014/0255236 A1 * | 9/2014 | Ambrosi | F01C 21/02 418/166 |
| 2016/0153546 A1 | 6/2016 | Ogawa et al. | |
| 2017/0227006 A1 | 8/2017 | Lewis et al. | |

FOREIGN PATENT DOCUMENTS

| | | |
|---|---|---|
| JP | 62-29487 U | 2/1987 |
| JP | 2010-004603 A | 1/2010 |
| JP | 2010-252521 A | 11/2010 |
| JP | 2011-004487 A | 1/2011 |
| JP | 2013-055728 A | 3/2013 |
| JP | 2016-101042 A | 5/2016 |
| JP | 2016-181954 A | 10/2016 |
| JP | 2017-063542 A | 3/2017 |
| WO | 2016/033015 A1 | 3/2016 |

OTHER PUBLICATIONS

Migita et al., "Drive Device", U.S. Appl. No. 16/323,632, filed Feb. 6, 2019.
Yamaguchi et al., "Drive Apparatus", U.S. Appl. No. 16/323,633, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,640, filed Feb. 6, 2019.
Official Communication issued in International Patent Application No. PCT/JP2017/028693, dated Nov. 28, 2017.

\* cited by examiner

DRIVE DEVICE

BACKGROUND OF THE INVENTION

1. Field of the Invention

The present disclosure relates to a drive device.

2. Description of the Related Art

There is known a rotary electric machine including a case in which a lubricating fluid for lubrication and cooling of a stator, a rotor, and the like is stored.

In some cases, a pump that sucks up oil stored in the case is provided in the rotary electric machine. The oil is sucked up by the pump to supply the oil to the rotor and the stator, which allows the rotor and the stator to be cooled. In this case, it is conceivable that the pump is driven by a shaft. In this case, for example, the pump includes an external gear fixed to the rotating shaft of the rotary electric machine and an internal gear meshing with the external gear.

At this point, in the case that coaxial accuracy between the rotor and the stator is relatively low, sometimes the external gear fixed to the rotating shaft is displaced with respect to the internal gear to strongly press the external gear against the internal gear. For this reason, the external gear and the internal gear are worn out, and sometimes the pump is damaged.

SUMMARY OF THE INVENTION

According to an example embodiment of the present disclosure, a drive device includes a rotor including a motor shaft disposed along a center axis extending in one direction and a rotor core fixed to the motor shaft; a stator radially opposed to the rotor with a gap interposed therebetween; a housing including an accommodation portion to oil and accommodate the rotor and the stator; and a pump driven through the motor shaft. The pump includes an external gear fixed to an end on one side in an axial direction of the motor shaft; an internal gear that surrounds a radial outside of the external gear and meshes with the external gear; a pump room accommodating the internal gear and the external gear; a suction port through which the oil is to be sucked into the pump room; and a discharge port through which the oil is to be discharged from the pump room, the housing includes an outer lid in which the pump room is provided, the outer lid includes a shaft insertion hole penetrating the outer lid from a surface on the other side in the axial direction of the pump room to a surface on the other side in the axial direction of the outer lid, the motor shaft being inserted into the shaft insertion hole; and a support defining at least a portion of the surface on the other side in the axial direction of the pump room and at least a portion of a radially inside surface of the shaft insertion hole, and the support journals the motor shaft on the radial outside of the motor shaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A Z-axis direction illustrated in each drawing is a vertical direction Z in which a positive side is set to an upper side while a negative side is set to a lower side. In the embodiment, the vertical direction Z is an up-and-down direction in each drawing. In the following description, the vertically upper side is simply referred to as an "upper side", and the vertically lower side is simply referred to as a "lower side".

Figure 1:
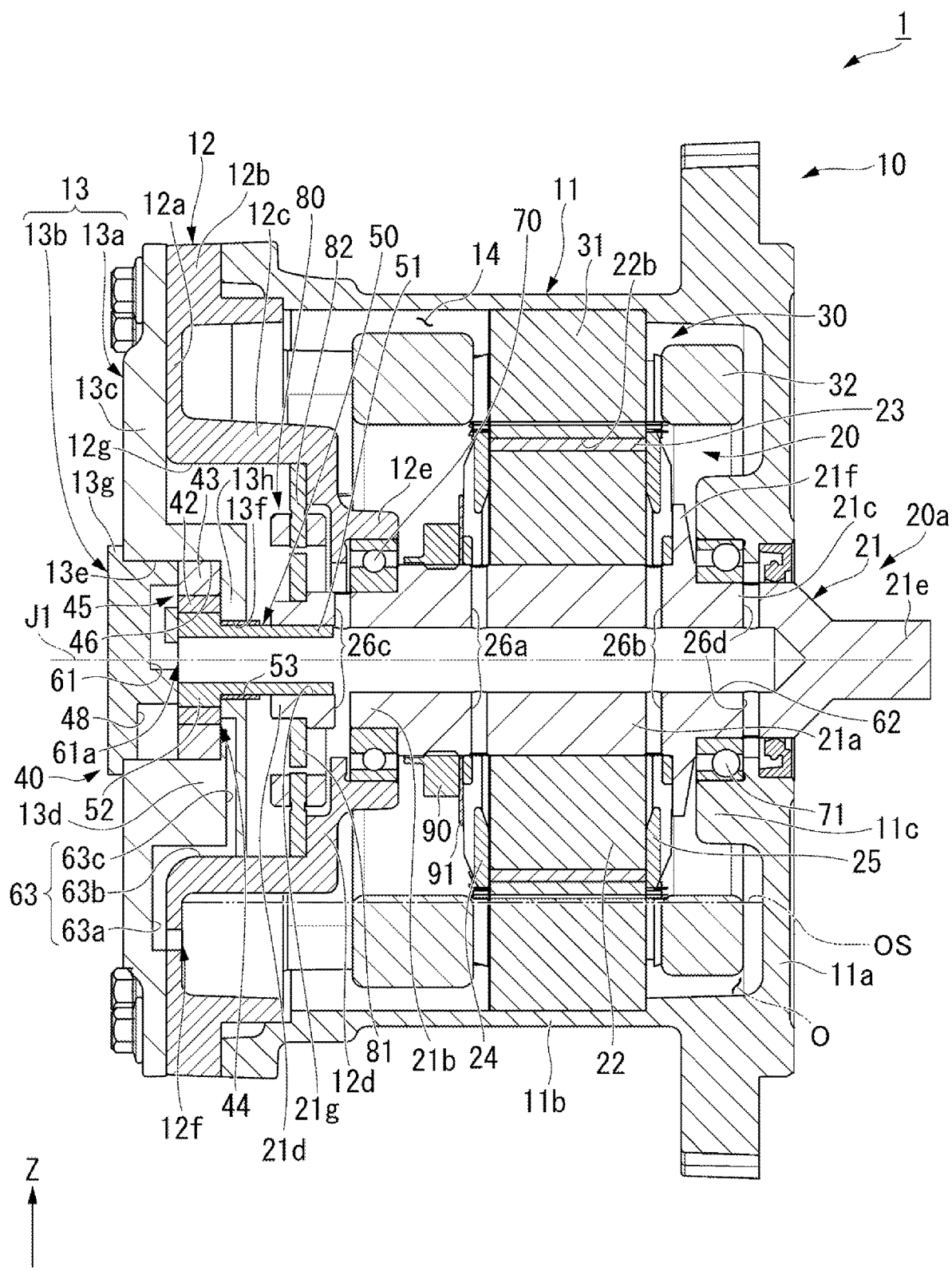
FIG. 1 is a sectional view illustrating a drive apparatus according to an example embodiment of the present disclosure.

As illustrated in FIG. 1, a drive device 1 of the embodiment includes a housing 10, a rotor 20 including a motor shaft 20a disposed along a center axis J1 extending in one direction, a rotation detector 80, a stator 30, a pump 40, and bearings 70, 71.

The center axis J1 extends in a lateral direction of FIG. 1. That is, in the embodiment, the lateral direction in FIG. 1 corresponds to one direction. In the following description, a direction parallel to the center axis J1 is simply referred to as an "axial direction", a radial direction centered on the center axis J1 is simply referred to as a "radial direction", and a circumferential direction centered on the center axis J1 is simply referred to as a "circumferential direction". In the axial direction, a left side in FIG. 1 is referred to as "one side in the axial direction", and a right side in FIG. 1 in the axial direction is referred to as "the other side in the axial direction".

The housing 10 includes a main body 11, an inner lid 12, and an outer lid 13. In the embodiment, the main body 11, the inner lid 12, and the outer lid 13 are a separate member. The main body 11 has a bottomed tubular shape that is open on one side in the axial direction. The main body 11 includes a bottom unit 11a, a main body tube 11b, and a bearing holder 11c. The bottom unit 11a has an annular plate shape expanding in the radial direction. The main body tube 11b has a cylindrical shape extending from a radially outer edge of the bottom unit 11a toward one side in the axial direction. The bearing holder 11c has a cylindrical shape protruding from an inner edge of the bottom unit 11a toward one side in the axial direction. The bearing holder 11c holds the bearing 71 in an inner circumferential surface of the bearing holder 11c.

The inner lid 12 is attached to one side in the axial direction of the main body 11. The inner lid 12 includes an annular plate 12a, an outer tube 12b, an inner tube 12c, an inner tube bottom unit 12d, and a bearing holder 12e. The annular plate 12a has an annular plate shape expanding in the radial direction. The annular plate 12a covers one side in the axial direction of the stator 30. That is, the inner lid 12 covers one side in the axial direction of the stator 30. An opening 12f axially penetrating the annular plate 12a is provided at a lower end of the annular plate 12a. The opening 12f is exposed to an inside of an accommodation unit 14 (to be described later).

The outer tube 12b has a cylindrical shape extending from a radially outer edge of the annular plate 12a toward the other side in the axial direction. An end on the other side in the axial direction of the outer tube 12b is fixed while contacting with an end on one side in the axial direction of the main body tube 11b. The inner tube 12c has a cylindrical shape extending from a radially inner edge of the annular plate 12a toward the other side in the axial direction. The inner tube bottom unit 12d has an annular shape expanding radially inward from the end on the other side in the axial direction of the inner tube 12c. A second recess 12g recessed from the surface on one side in the axial direction of the inner lid 12 toward the other side in the axial direction is provided in the inner lid 12 by the inner tube 12c and the inner tube bottom unit 12d. That is, the inner lid 12 includes the second recess 12g. In the embodiment, the surface on one side in the axial direction of the inner lid 12 is the surface on one side in the axial direction of the annular plate 12a. The inside surface of the second recess 12g includes a radially inside surface of the inner tube 12c and a surface on one side in the axial direction of the inner tube bottom unit 12d.

The bearing holder 12e has a cylindrical shape projecting from a surface on the other side in the axial direction of the inner tube bottom unit 12d toward the other side in the axial direction. The bearing holder 12e holds the bearing 70 in the inner circumferential surface of the bearing holder 12e. That is, the inner lid 12 holds the bearing 70.

The accommodation unit 14 surrounded by the main body 11 and the inner lid 12 is formed by fixing the main body 11 and the inner lid 12 to each other. That is, the housing 10 includes the accommodation unit 14. The accommodation unit 14 can store oil O while accommodating the rotor 20 and the stator 30. The oil O is stored in a lower region in the vertical direction of the accommodation unit 14. As used herein, "the lower region in the vertical direction in the accommodation unit" includes a portion located below a center in the vertical direction Z in the accommodation unit.

In the embodiment, a liquid level OS of the oil O stored in the accommodation unit 14 is located above the opening 12f. Consequently, the opening 12f is exposed to the oil O stored in the accommodation unit 14. The liquid level OS of the oil O fluctuates by sucking up the oil O using the pump 40, but is disposed below the rotor 20 at least when the rotor 20 rotates. Consequently, when the rotor 20 rotates, the oil O can be prevented from becoming rotational resistance of the rotor 20.

The outer lid 13 is attached to one side in the axial direction of the inner lid 12. The outer lid 13 includes an outer lid body 13a and a plug body 13b. The outer lid body 13a expands in the radial direction. The outer lid body 13a has a lid plate 13c and a protrusion 13d. The lid plate 13c has a disc shape expanding in the radial direction. A radially outer edge of the lid plate 13c is fixed to a radially outer edge of the annular plate 12a. The surface on the other side in the axial direction of the lid plate 13c contacts with the surface on one side in the axial direction of the annular plate 12a. The protrusion 13d protrudes from a central portion of the lid plate 13c toward the other side in the axial direction. The protrusion 13d is inserted into the inner tube 12c from one side in the axial direction. The protrusion 13d is disposed at an interval on one side in the axial direction of the inner tube bottom unit 12d.

The outer lid body 13a includes a first recess 13e and a shaft insertion hole 13f. That is, the outer lid 13 includes the shaft insertion hole 13f. The first recess 13e is recessed from a surface on one side in the axial direction of the outer lid body 13a toward the other side in the axial direction. The first recess 13e is provided in the central portion of the outer lid body 13a, and is provided over the lid plate 13c and the protrusion 13d. The shaft insertion hole 13f penetrates from a bottom surface of the first recess 13e to a surface on the other side in the axial direction of the protrusion 13d. That is, the shaft insertion hole 13f penetrates from the bottom of the first recess 13e to the inside of the housing 10. The shaft insertion hole 13f is open to the inside of the second recess 12g. Consequently, the shaft insertion hole 13f connects the inside of the first recess 13e and the inside of the second recess 12g. The center axis J1 passes through the shaft insertion hole 13f.

The plug body 13b is fitted in the first recess 13e, and fixed to the outer lid body 13a. The plug body 13b closes the opening on one side in the axial direction of the first recess 13e. The plug body 13b covers one side in the axial direction of the motor shaft 20a. That is, the outer lid 13 covers one side in the axial direction of the motor shaft 20a. The plug body 13b includes a collar 13g protruding radially outward at an end on one side in the axial direction. The collar 13g contacts with the surface one side in the axial direction of the lid plate 13c. This allows the plug body 13b to be positioned in the axial direction.

Figure 2:
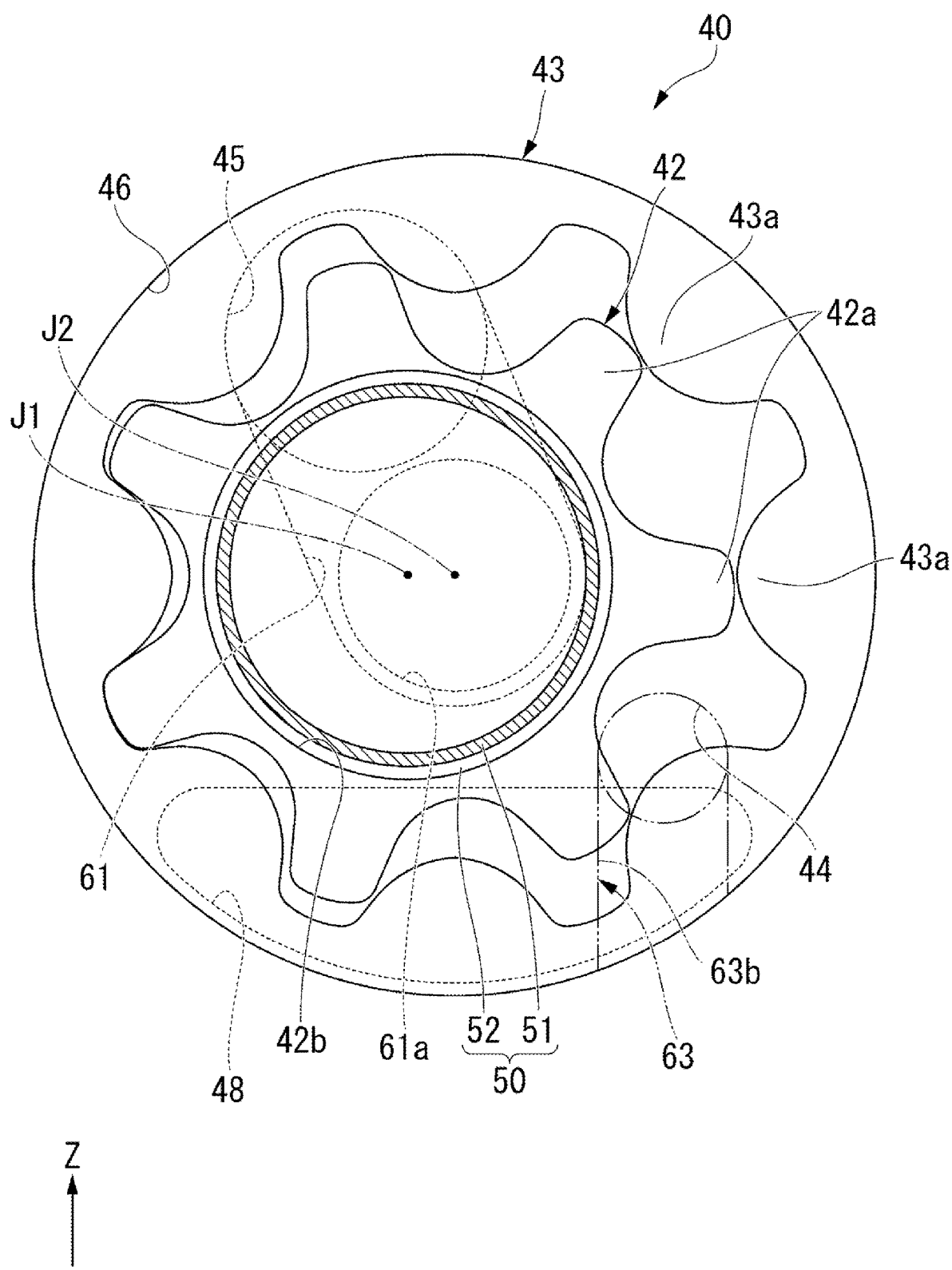
FIG. 2 is a diagram illustrating a pump portion according to an example embodiment of the present disclosure when viewed from a second axial side.

A pump room 46 is provided in the outer lid 13. The pump room 46 is axially provided between the surface on the other side in the axial direction of the plug body 13b and the bottom surface of the first recess 13e. In the embodiment, the surface on the other side in the axial direction of the pump room 46 is the bottom surface of the first recess 13e. That is, the shaft insertion hole 13f penetrates the outer lid 13 from the surface on the other side in the axial direction of the pump room 46 to the surface on the other side in the axial direction of the outer lid 13. The surface on one side in the axial direction of the pump room 46 is the surface on the other side in the axial direction of the plug body 13b. The pump room 46 is an end on the other side in the axial direction in the inside of the first recess 13e. The pump room 46 is disposed on a radial inside of the inner tube 12c, namely, the inside of the second recess 12g. The center axis J1 passes through the pump room 46. As illustrated in FIG. 2, the outer shape of the pump room 46 is a circular shape in axial view. The pump room 46 accommodates an internal gear 43 and an external gear 42 (to be described later).

Figure 3:
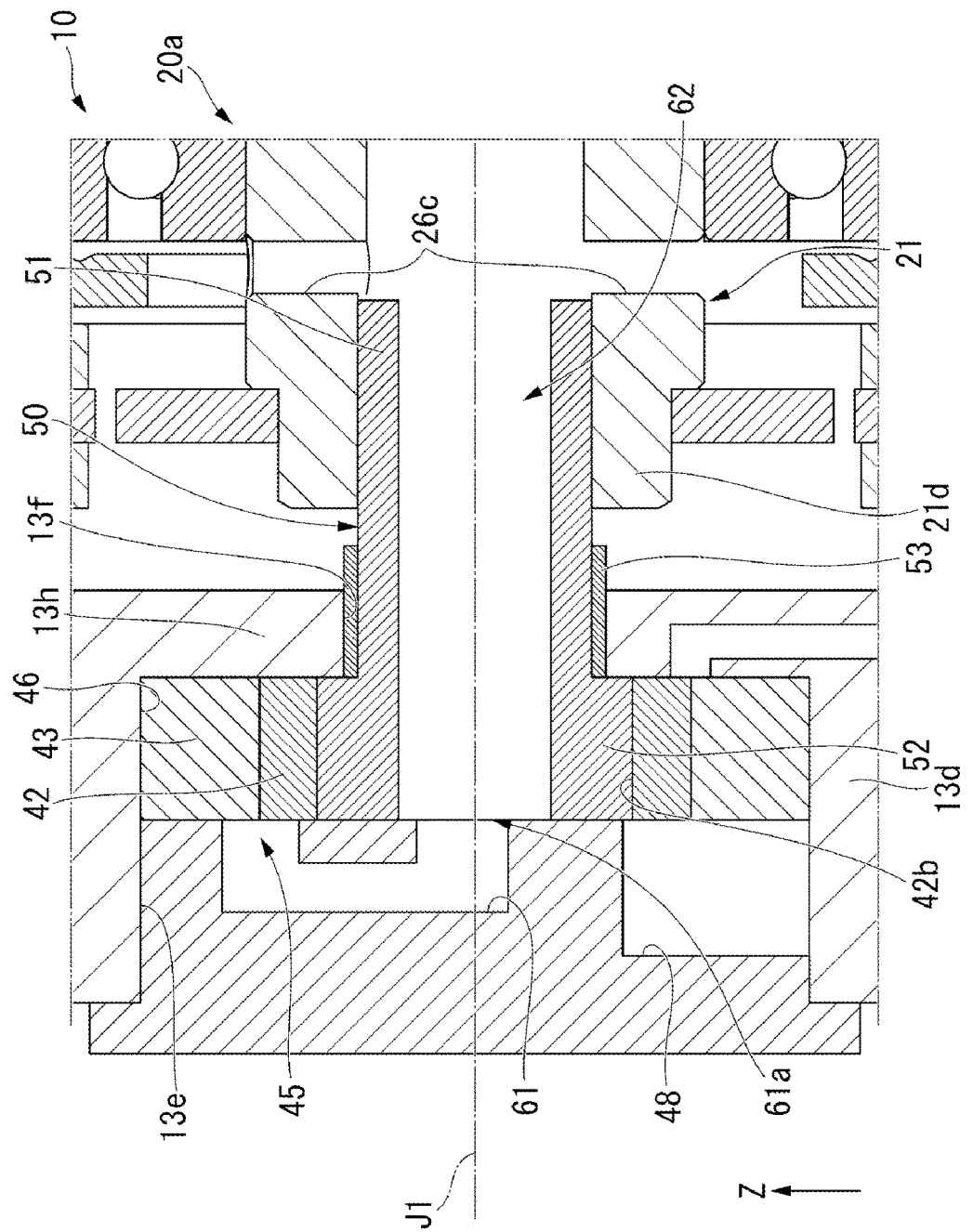
FIG. 3 is a sectional view illustrating a portion of the drive apparatus according to an example embodiment of the present disclosure.

As illustrated in FIG. 3, the outer lid 13 includes a support unit 13h. The support unit 13h is a portion located on the other side in the axial direction of the first recess 13e of the protrusion 13d. The support unit 13h has an annular shape surrounding a radial outside of the motor shaft 20a. In the embodiment, the support unit 13h has the annular shape centered on the center axis J1. A radially inside surface of the support unit 13h is a radially inside surface of the shaft insertion hole 13f. That is, the support unit 13h constitutes at least a part of the radially inside surface of the shaft insertion hole 13f. The surface on one side in the axial direction of the support unit 13h is the bottom surface of the first recess 13e, and is the surface on the other side in the axial direction of the pump room 46. That is, the support unit 13h constitutes at least a part of the surface on the other side in the axial direction of the pump room 46. In the embodiment, the support unit 13h is a part of the outer lid body 13a that is a single member.

As illustrated in FIG. 1, the housing 10 includes a first oil passage 61 and a third oil passage 63. The first oil passage 61 is provided in the outer lid 13. More particularly, the first oil passage 61 is provided in the plug body 13b. For this reason, the configuration of the first oil passage 61 can easily be changed by exchanging the plug body 13b. The first oil passage 61 is disposed on one side in the axial direction of the pump room 46. The first oil passage 61 connects an upper end of the pump room 46 and the central portion of the pump room 46 on one side in the axial direction of the pump room 46. A portion of the first oil passage 61 connected to the pump room 46 is open to the surface on the other side in the axial direction of the plug body 13b.

The upper end connected to the first oil passage 61 in the pump room 46 is a discharge port 45. That is, the first oil passage 61 is connected to the discharge port 45. The central portion connected to the first oil passage 61 in the pump room 46 is a connection port 61a. As illustrated in FIG. 2, for example, the discharge port 45 and the connection port 61a have a circular shape. The discharge port 45 is disposed above the connection port 61a. The center axis J1 passes through the connection port 61a.

As illustrated in FIG. 1, the third oil passage 63 extends upward from the opening 12f. The third oil passage 63 is connected to a lower region in the vertical direction in the inside of the accommodation unit 14 with the opening 12f interposed therebetween. The upper end of the third oil passage 63 is connected to the pump room 46 on the other side in the axial direction of the pump room 46. The portion connected to the third oil passage 63 in the pump room 46 is a suction port 44. That is, the third oil passage 63 connects the lower region in the vertical direction in the inside of the accommodation unit 14 and the suction port 44. As illustrated in FIG. 2, for example, the suction port 44 has the circular shape. The suction port 44 is disposed below the discharge port 45 and the connection port 61a. The suction port 44 is disposed below the center axis J1.

As illustrated in FIG. 1, the third oil passage 63 includes a first portion 63a, a second portion 63b, and a third portion 63c. The first portion 63a extends upward from the opening 12f. The upper end of the first portion 63a is located above the inner circumferential surface at the lower end of the inner tube 12c. For example, the first portion 63a is formed by closing a groove, which is recessed from the surface on the other side in the axial direction of the lid plate 13c to one side in the axial direction and extends in the vertical direction Z, by the surface on one side in the axial direction of the annular plate 12a. Consequently, the first portion 63a is axially disposed between the inner lid 12 and the outer lid 13.

The second portion 63b extends from the upper end of the first portion 63a toward the other side in the axial direction. The second portion 63b is formed by closing the groove recessed upward from the lower surface of the protrusion 13d toward the other side in axial direction of the recess by the inner circumferential surface of the inner tube 12c. Consequently, the second portion 63b is radially disposed between the inner lid 12 and the outer lid 13.

The third portion 63c extends upward from the end on the other side in the axial direction of the second portion 63b. The third portion 63c is provided in the protrusion 13d. The upper end of the third portion 63c is provided in the support unit 13h. The third portion 63c is disposed on the radial inside of the inner tube 12c. The third portion 63c is connected to the suction port 44. In the embodiment, at least a part of the third oil passage 63 is axially disposed between the inner lid 12 and the outer lid 13. For this reason, at least a part of the third oil passage 63 can be constructed with the inner lid 12 and the outer lid 13, which are fixed to each other, and the third oil passage 63 can easily be manufactured.

The rotor 20 includes a motor shaft 20a, a bush 53, a rotor core 22, a magnet 23, a first end plate 24, and a second end plate 25. The motor shaft 20a includes a motor shaft body 21 and a mounting member 50. The motor shaft body 21 has a columnar shape extending in the axial direction. The motor shaft body 21 includes a large diameter unit 21a, a first intermediate diameter unit 21b, a second intermediate diameter unit 21c, a small diameter unit 21d, and an output unit 21e.

The large diameter unit 21a is a portion to which the rotor core 22 is attached. A male screw portion is provided on the outer circumferential surface at the end on one side in the axial direction of the large diameter unit 21a. A nut 90 is tightened to the male screw portion of the large diameter unit 21a. The first intermediate diameter unit 21b is connected to the large diameter unit 21a on one side in the axial direction of the large diameter unit 21a. An outer diameter of the first intermediate diameter unit 21b is smaller than an outer diameter of the large diameter unit 21a. The end on the other side in the axial direction of the first intermediate diameter unit 21b is journaled by the bearing 70.

The second intermediate diameter unit 21c is connected to the large diameter unit 21a on the other side in the axial direction of the large diameter unit 21a. The outer diameter of the second intermediate diameter unit 21c is smaller than the outer diameter of the large diameter unit 21a. The end on the other side in the axial direction of the second intermediate diameter unit 21c is journaled by the bearing 71. The motor shaft 20a is journaled by the bearings 70, 71. For example, the bearings 70, 71 are a ball bearing.

The small diameter unit 21d is connected to the first intermediate diameter unit 21b on one side in the axial direction of the first intermediate diameter unit 21b. The end on one side in the axial direction of the small diameter unit 21d is the end on one side in the axial direction of the motor shaft body 21. The end on one side in the axial direction of the small diameter unit 21d is disposed on the radial inside of the inner tube 12c. The outer diameter of the small diameter unit 21d is smaller than the outer diameter of the first intermediate diameter unit 21b. That is, the small diameter unit 21d is a portion where the outer diameter decreases toward one side in the axial direction.

The output unit 21e is connected to the second intermediate diameter unit 21c on the other side in the axial direction of the second intermediate diameter unit 21c. The output unit 21e is an end on the other side in the axial direction of the motor shaft body 21. The outer diameter of the output unit 21e is smaller than the outer diameter of the small diameter unit 21d. The output unit 21e axially penetrates the bottom unit 11a to protrude to the outside of the housing 10.

The motor shaft body 21 includes a flange 21f. The flange 21f protrudes radially outward from the outer circumferential surface of the large diameter unit 21a. The flange 21f has the annular plate shape that is provided over a whole circumference of the outer circumferential surface of the large diameter unit 21a. The flange 21f is provided at the end on the other side in the axial direction of the large diameter unit 21a. The motor shaft body 21 includes a hole 21g extending from the end on one side in the axial direction of the motor shaft body 21 to the other side in the axial direction. The hole 21g is a bottomed hole that is open to one side in the axial direction. That is, the end on the other side in the axial direction of the hole 21g is closed.

As illustrated in FIG. 3, the mounting member 50 is fixed to one side in the axial direction of the motor shaft body 21. The mounting member 50 is fitted in and fixed to the hole 21g. The mounting member 50 has the tubular shape that is open to both axial sides. In the embodiment, the mounting member 50 has the cylindrical shape centered on the center axis J1. The mounting member 50 extends toward one side in the axial direction with respect to the motor shaft body 21, and is inserted into the shaft insertion hole 13f. Consequently, the motor shaft 20a is inserted into the shaft insertion hole 13f.

The mounting member 50 includes a fitting unit 51 and a fixing unit 52. The fitting unit 51 is a portion fitted in the hole 21g. The fitting unit 51 is fixed to the inner circumferential surface at the end on one side in the axial direction of the hole 21g, and extends from the inside of the hole 21g to one side in the axial direction with respect to the motor shaft body 21. The end of one side in the axial direction of the fitting unit 51 is inserted into the shaft insertion hole 13f. That is, at least a part of the fitting unit 51 is inserted into the shaft insertion hole 13f.

The fixing unit 52 is located on one side in the axial direction of the fitting unit 51. The fixing unit 52 is connected to the end on one side in the axial direction of the fitting unit 51. The outer diameter of the fixing unit 52 is larger than the outer diameter of the fitting unit 51, and larger than an inner diameter of the shaft insertion hole 13f. The fixing unit 52 is an increased diameter unit in which the outer diameter is increased from the other side in the axial direction toward one side in the axial direction. The fixing unit 52 is inserted into the pump room 46. The fixing unit 52 is disposed while opposed to one side in the axial direction of the support unit 13h. This enables the support unit 13h to prevent movement of the fixing unit 52 onto the other side in the axial direction. Consequently, the motor shaft 20a can be prevented from being disengaged from the external gear 42 (to be described later). The inner diameter of the shaft insertion hole 13f is smaller than the outer diameter of the fixing unit 52, so that the inner diameter of the shaft insertion hole 13f can relatively be decreased. Consequently, the oil O in the pump room 46 can easily be prevented from leaking through the shaft insertion hole 13f.

Although not illustrated, a gap is axially provided between the fixing unit 52 and the support unit 13h. For this reason, when the motor shaft 20a rotates, the fixing unit 52 can be prevented from rubbing against the support unit 13h, and the motor shaft 20a can smoothly be rotated. For example, the inner diameter of the fitting unit 51 and the inner diameter of the fixing unit 52 are identical to each other.

The external gear 42 (to be described later) is fixed to the mounting member 50. In the embodiment, the external gear 42 is fixed to the radially outside surface of the fixing unit 52. More particularly, the fixing unit 52 is fitted in and fixed to a fixing hole 42b axially penetrating the external gear 42. That is, in the embodiment, the portion of the motor shaft 20a to which the external gear 42 is fixed is the fixing unit 52. As described above, in the embodiment, the fitting unit 51 having the outer diameter smaller than that of the fixing unit 52 is fitted in the hole 21g, and the external gear 42 is fixed to the fixing unit 52 having the outside diameter larger than that of the fitting unit 51. For this reason, the inner diameter of the hole 21g can be made smaller than the inner diameter of the fixing hole 42b of the external gear 42. Consequently, the inner diameter of the hole 21g can easily be made relatively small, and a decrease in rigidity of the motor shaft body 21 can be prevented.

In the embodiment, for example, an assembling worker inserts the fitting unit 51 into the shaft insertion hole 13f from the opening on the left side of the first recess 13e after attaching the outer lid 13 to the inner lid 12, and the mounting member 50 is fixed to the motor shaft body 21 by fitting the fitting unit 51 in the hole 21g of the motor shaft body 21.

The motor shaft 20a has a second oil passage 62 provided in the motor shaft 20a. The second oil passage 62 is a bottomed hole that is recessed from the end on one side in the axial direction of the motor shaft 20a toward the other side in the axial direction. The second oil passage 62 is open to one side in the axial direction. The second oil passage 62 extends from the end on one side in the axial direction of the mounting member 50 to the end on the other side in the axial direction of the second intermediate diameter unit 21c, and is provided over the mounting member 50 and the motor shaft body 21. The second oil passage 62 is formed by axially connecting the inside of the mounting member 50 and the hole 21g. That is, the radially inside surface of the mounting member 50 constitutes a part of the radially inside surface of the second oil passage 62.

In the embodiment, the inner edge of the second oil passage 62 in a section orthogonal to the axial direction has the circular shape centered on the center axis J1. The inner diameter of the portion of the second oil passage 62 provided in the mounting member 50 is smaller than the inner diameter of the portion of the second oil passage 62 provided in the motor shaft body 21. That is, the inner diameter of the mounting member 50 is smaller than the inner diameter of the hole 21g. The opening on one side in the axial direction of the mounting member 50 is connected to the connection port 61a, which allows the second oil passage 62 to be connected to the first oil passage 61 through the inside of the mounting member 50. That is, the second oil passage 62 is open to the first oil passage 61 at the end on one side in the axial direction of the motor shaft 20a.

Figure 4:
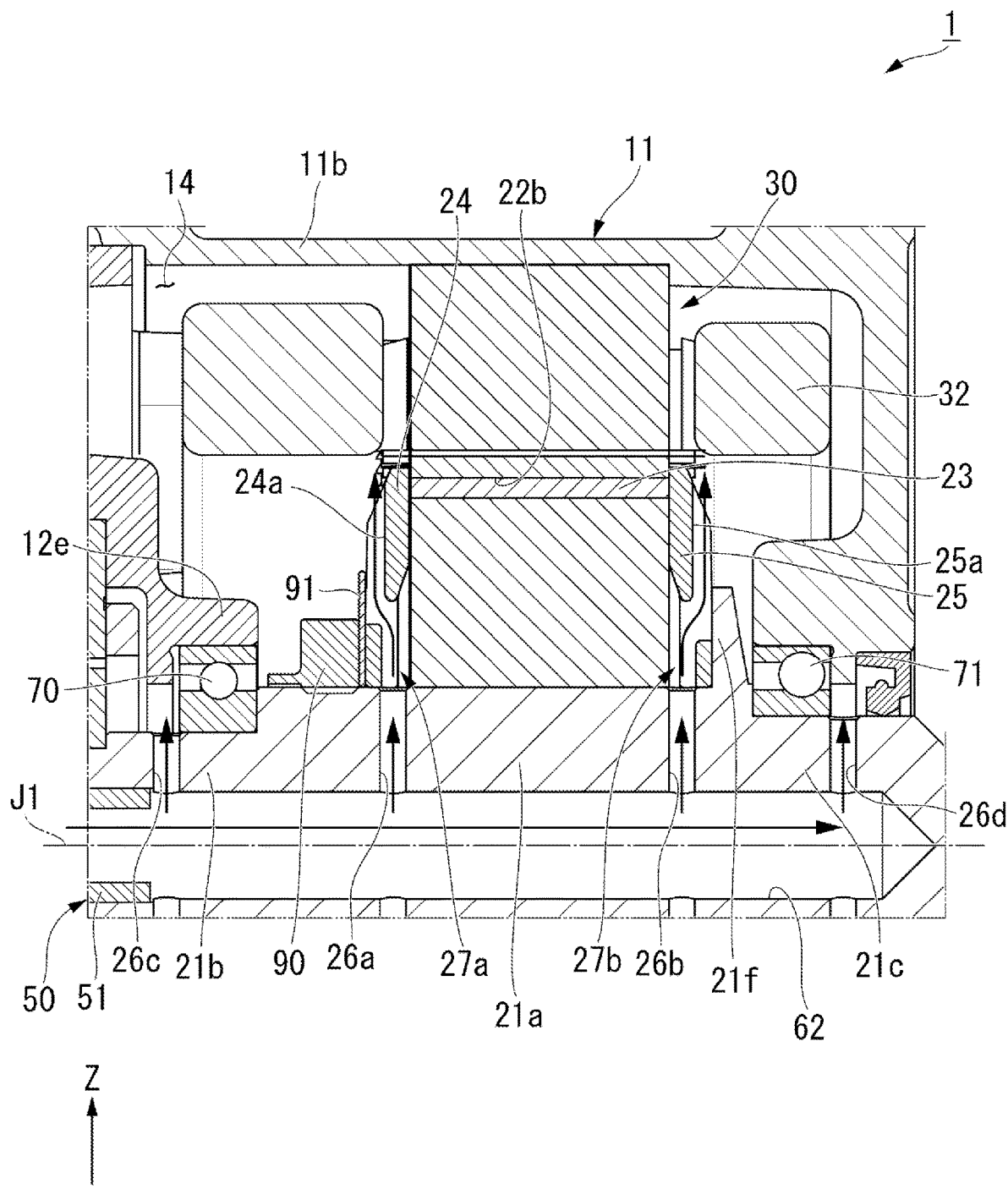
FIG. 4 is a sectional view of a drive apparatus according to a first modification of an example embodiment of the present disclosure.

As illustrated in FIG. 4, the motor shaft 20a includes first oil supply holes 26a, 26b and second oil supply holes 26c, 26d, which connect the second oil passage 62 and the outer circumferential surface of the motor shaft 20a. The first oil supply holes 26a, 26b and the second oil supply holes 26c, 26d extend in the radial direction. The first oil supply holes 26a, 26b are made in the large diameter unit 21a. The first oil supply holes 26a, 26b are axially disposed between the nut 90 and the flange 21f. The radially outside end of the first oil supply hole 26a is open to the axial gap 27a between the first end plate 24 and the rotor core 22. The radially outside end of the first oil supply hole 26b is open to the axial gap 27b between the second end plate 25 and the rotor core 22.

The second oil supply hole 26c is made in the first intermediate diameter unit 21b. The radially outside end of the second oil supply hole 26c is open to the radial inside of the bearing holder 12e on one side in the axial direction of the bearing 70. The second oil supply hole 26d is made in the second intermediate diameter unit 21c. The radially outside end of the second oil supply hole 26d is open to the radial inside of the bearing holder 11c on the other side in the axial direction of the bearing 71. For example, a plurality of the first oil supply holes 26a, 26b and the plurality of second oil supply holes 26c, 26d are made along the circumferential direction. In the embodiment, the first oil supply holes 26a, 26b correspond to the first through-holes.

As illustrated in FIG. 3, the bush 53 extends in the axial direction, and has the cylindrical shape centered on the center axis J1. The bush 53 is fitted in and fixed to the motor shaft 20a. More particularly, the bush 53 is fitted in and fixed to the fitting unit 51 from the radial outside. For example, the bush 53 is pressed into the fitting unit 51. At least a part of the bush 53 is radially disposed between the support unit 13h and the motor shaft 20a. That is, at least a part of the bush 53 is inserted into the shaft insertion hole 13f. In the embodiment, the portion from the end on one side in the axial direction of the bush 53 to the other side in the axial direction with respect to the center in the axial direction of the bush 53 is radially disposed between the support unit 13h and the fitting unit 51. The end on one side in the axial direction of the bush 53 contacts with the end on the other side in the axial direction of the fixing unit 52. The end on the other side in the axial direction of the bush 53 protrudes toward the other side in the axial direction with respect to the support unit 13h. The gap is provided between the end on the other side in the axial direction of the bush 53 and the end on one side in the axial direction of the motor shaft body 21.

In the embodiment, the motor shaft 20a is journaled by the support unit 13h with the bush 53 interposed therebetween. That is, the support unit 13h journals the motor shaft 20a on the radial outside of the motor shaft 20a. In the embodiment, the support unit 13h journals the mounting member 50. More particularly, the fitting unit 51 is journaled for the support unit 13h.

As used herein, the term "the support unit journals the motor shaft" means that the support unit prevents the motor shaft from moving in the radial direction while the motor shaft is rotatable around the center axis J1 and the motor shaft rotates while sliding directly or indirectly relative to the radially inner end of the support unit. The term "the motor shaft rotates while sliding indirectly against the radially inner end of the support unit" means that the member fixed to the outer circumferential surface of the motor shaft rotates while sliding against the radially inner end of the support unit. In the embodiment, the outer circumferential surface of the bush 53 fixed to the motor shaft 20a rotates while sliding against the radially inner end of the support 13h. The radially inner end of the support unit 13h is the inner circumferential surface of the shaft insertion hole 13f.

As illustrated in FIG. 1, the rotor core 22 has the annular shape fixed to the motor shaft body 21. In the embodiment, the rotor core 22 is fitted in the large diameter unit 21a. The rotor core 22 includes a magnet insertion hole 22b axially penetrating the rotor core 22. A plurality of magnet insertion holes 22b is provided along the circumferential direction. The magnet 23 is inserted into the magnet insertion hole 22b.

The first end plate 24 and the second end plate 25 have the annular plate shape expanding in the radial direction. The large diameter unit 21a is inserted into the first end plate 24 and the second end plate 25. The first end plate 24 and the second end plate 25 axially sandwich the rotor core 22 while contacting with the rotor core 22.

As illustrated in FIG. 4, the first end plate 24 is disposed on one side in the axial direction of the rotor core 22. The radially outer edge of the first end plate 24 protrudes to the other side in the axial direction, and contacts with the radially outer edge in the surface on one side in the axial direction of the rotor core 22. The outer edge in the radial direction of the first end plate 24 axially overlaps the opening on one side in the axial direction of the magnet insertion hole 22b, and presses the magnet 23 inserted into the magnet insertion hole 22b from one side in the axial direction. A radially inside portion with respect to the outer edge in the radial direction of the first end plate 24 is axially opposed to the surface on one side in the axial direction of the rotor core 22 with a gap 27a interposed therebetween.

The first end plate 24 includes an exhaust groove 24a recessed from the surface on one side in the axial direction of the first end plate 24 toward the other side in the axial direction. The exhaust groove 24a extends in the radial direction. The radially inside end of the exhaust groove 24a axially penetrates the first end plate 24, and is connected to the gap 27a. The radially outside end of the exhaust groove 24a is open to the radial outside of the first end plate 24, and is radially opposed to the coil 32 (to be described later) with a gap interposed therebetween. Consequently, the first oil supply hole 26a is connected to the inside of the accommodation unit 14 through the gap 27a and the exhaust groove 24a. The opening on one side in the axial direction in the portion on the radial inside of the exhaust groove 24a is closed by a washer 91 that is fixed while axially sandwiched between the nut 90 and the first end plate 24. The washer 91 has the annular plate shape expanding in the radial direction.

The second end plate 25 is disposed on the other side in the axial direction of the rotor core 22. The radially outer edge of the second end plate 25 protrudes to one side in the axial direction, and contacts with the radially outer edge in the surface on the other side in the axial direction of the rotor core 22. The outer edge in the radial direction of the second end plate 25 axially overlaps the opening on the other side in the axial direction of the magnet insertion hole 22b, and presses the magnet 23 inserted into the magnet insertion hole 22b from the other side in the axial direction. Consequently, both sides in the axial direction of the magnet 23 inserted into the magnet insertion hole 22b are pressed by the first end plate 24 and the second end plate 25. Thus, the magnet 23 can be prevented from coming out of the magnet insertion hole 22b.

A radially inside portion with respect to the outer edge in the radial direction of the second end plate 25 is axially opposed to the surface on the other side in the axial direction of the rotor core 22 with a gap 27b interposed therebetween. The second end plate 25 includes exhaust grooves 25a recessed from the surface on the other side in the axial direction of the second end plate 25 toward one side in the axial direction. The exhaust groove 25a extends in the radial direction. The radially inside end of the exhaust groove 25a axially penetrates the second end plate 25, and is connected to the gap 27b. The radially outside end of the exhaust groove 25a is open to the radial outside of the second end plate 25, and is radially opposed to the coil 32 (to be described later) with a gap interposed therebetween. Consequently, the first oil supply hole 26b is connected to the inside of the accommodation unit 14 through the gap 27b and the exhaust groove 25a. The opening on the other side in the axial direction in the radial inside portion of the exhaust groove 25a is closed by the flange 21f.

The first end plate 24, the rotor core 22, and the second end plate 25 are axially sandwiched between the nut 90 and the washer 91 and the flange 21f. The nut 90 is tightened into the male screw portion of the large diameter unit 21a, which allows the nut 90 to press the first end plate 24, the rotor core 22, and the second end plate 25 against the flange 21f with the washer 91 interposed therebetween. Consequently, the first end plate 24, the rotor core 22, and the second end plate 25 are fixed to the motor shaft 20a.

The rotation detector 80 in FIG. 1 detects rotation of the rotor 20. In the embodiment, for example, the rotation detector 80 is a Variable Reluctance (VR) type resolver. The rotation detector 80 is disposed on the radial inside of the inner tube 12c. The rotation detector 80 includes a detection target unit 81 and a sensor 82.

The detection target unit 81 has an annular shape extending in the circumferential direction. The detection target unit 81 is fitted in and fixed to the motor shaft 20a. More particularly, the detection target unit 81 is fitted in and fixed to the small diameter unit 21*d*. The surface on the other side in the axial direction at the radially inner edge of the detection target unit 81 contacts with a step between the first intermediate diameter unit 21*b* and the small diameter unit 21*d*. The detection target unit 81 radially overlaps the mounting member 50. For this reason, the motor shaft 20*a* can be easily downsized in the axial direction as compared with the case that the detection target unit 81 and the mounting member 50 are axially disposed at an interval while not radially overlapping each other. The detection target unit 81 is made of a magnetic material.

As used herein, "certain objects overlap each other in a certain direction" includes the case that certain objects overlap each other when viewed along a certain direction. That is, the term "the detection target unit 81 radially overlaps the mounting member 50" includes the overlap of the detection target unit 81 and the mounting member 50 when viewed along the radial direction.

The sensor 82 is axially disposed between the inner lid 12 and the outer lid 13. More particularly, the sensor 82 is fixed to the surface on one side in the axial direction of the inner tube bottom unit 12*d* on the radial inside of the inner tube 12*c*. That is, the sensor 82 is attached to the inner lid 12. For this reason, the sensor 82 is easy to be attached. The sensor 82 is disposed in the second recess 12*g*. For this reason, after the inner lid 12 is attached to the main body 11, the sensor 82 can be disposed by inserting the sensor 82 into the second recess 12*g* from the opening on one side in the axial direction of the second recess 12*g*. Thus, the sensor 82 is easy to be disposed.

The sensor 82 has the annular shape surrounding the radial outside of the detection target unit 81. The sensor 82 includes a plurality of coils along the circumferential direction. When the detection target unit 81 rotates together with the motor shaft 20*a*, an induced voltage corresponding to the circumferential position of the detection target unit 81 is generated in the coil of the sensor 82. The sensor 82 detects the rotation of the detection target unit 81 by detecting the induced voltage. Consequently, the rotation detector 80 detects the rotation of the motor shaft 20*a*, and detects the rotation of the rotor 20.

The stator 30 is radially opposed to the rotor 20 with the gap interposed therebetween. The stator 30 includes the stator core 31 and the plurality of coils 32 mounted on the stator core 31. The stator core 31 has the annular shape centered on the center axis J1. The outer circumferential surface of the stator core 31 is fixed to the inner circumferential surface of the main body tube 11*b*. The stator core 31 is opposed to the radial outside of the rotor core 22 with the gap interposed therebetween.

The pump 40 is provided in the central portion of the outer lid 13. The pump 40 is disposed on one side in the axial direction of the motor shaft 20*a*. The pump 40 includes the external gear 42, the internal gear 43, the pump room 46 described above, a suction port 44, a discharge port 45, and a storage unit 48. The external gear 42 is a gear that is rotatable about the center axis J1. The external gear 42 is fixed to one end in the axial direction of the motor shaft 20*a*. More particularly, the external gear 42 is fixed to the outer circumferential surface of the fixing unit 52. For this reason, the external gear 42 can be fixed to the motor shaft body 21 with the mounting member 50 interposed therebetween. Consequently, by adjusting the size of the mounting member 50, the external gear 42 can be fixed to the motor shaft body 21 without changing the sizes of the motor shaft body 21 and the external gear 42.

The external gear 42 is accommodated in the pump room 46. As illustrated in FIG. 2, the external gear 42 includes a plurality of teeth 42*a* on the outer circumferential surface of the external gear 42. A tooth shape of the tooth 42*a* of the external gear 42 is a trochoidal tooth shape.

The internal gear 43 is an annular gear which is rotatable about a rotation axis J2 eccentric to the center axis J1. The internal gear 43 is accommodated in the pump room 46. The internal gear 43 surrounds the radial outside of the external gear 42, and meshes with the external gear 42. The internal gear has a plurality of teeth 43*a* on the inner circumferential surface of the internal gear 43. The tooth shape of the tooth 43*a* of the internal gear 43 is the trochoidal tooth shape. In this way, the tooth 42*a* of the external gear 42 and the tooth 43*a* of the internal gear 43 have the trochoidal tooth shape, so that a trochoid pump can be constructed. Thus, noise generated from the pump 40 can be reduced, and pressure and an amount of oil O discharged from the pump 40 can easily be stabilized.

In the embodiment, after the internal gear 43 and the external gear 42 are inserted from the opening on one side in the axial direction of the first recess 13*e*, the opening on one side in the axial direction of the first recess 13*e* is closed by the plug body 13*b*, which allows the internal gear 43 and the external gear 42 to be accommodated in the pump room 46 while the pump room 46 is formed. This enables the pump 40 to be easily assembled.

As described above, the suction port 44 is connected to the third oil passage 63. As illustrated in FIG. 1, the suction port 44 is open to the other side in the axial direction of the pump room 46. The suction port 44 is connected to the gap between the external gear 42 and the internal gear 43. The suction port 44 can suck the oil O stored in the accommodation unit 14 into the pump room 46, more particularly, the gap between the external gear 42 and the internal gear 43 through the opening 12*f* and the third oil passage 63. As illustrated in FIG. 2, the suction port 44 is disposed above the lower end of the storage unit 48 and above the lower end of the external gear 42.

As described above, the discharge port 45 is connected to the first oil passage 61. As illustrated in FIG. 1, the discharge port 45 is open to one side in the axial direction of the pump room 46. The discharge port 45 is connected to the gap between the external gear 42 and the internal gear 43. The discharge port 45 allows the oil O to be discharged from the pump room 46, more particularly, the gap between the external gear 42 and the internal gear 43.

The storage unit 48 is connected to the pump room 46 on one side in the axial direction of the lower region in the vertical direction of the pump room 46. As illustrated in FIG. 2, the storage unit 48 has a bow shape protruding downward in axial view. A part of the oil O sucked from the suction port 44 into the pump room 46 flows into the storage unit 48.

Because the suction port 44 is disposed above the lower end of the storage unit 48, even if the pump 40 stops, at least a part of the oil O flowing into the storage unit 48 is stored in the storage unit 48 without returning from the suction port 44 to the accommodation unit 14. Consequently, when the pump 40 stops, the lower portions of the external gear 42 and the internal gear 43 in the pump room 46 can contact with the oil O in the storage unit 48. Thus, when the pump 40 is driven again, the oil O can be interposed between the tooth 42*a* of the external gear 42 and the tooth 43*a* of the internal gear 43 and between the inner circumferential surface of the pump room 46 and the outer circumferential surface of the internal gear 43, and generation of seizure can be prevented.

When the rotor 20 rotates to rotate the motor shaft 20a, the external gear 42 fixed to the motor shaft 20a rotates. Consequently, the internal gear 43 meshing with the external gear 42 rotates to send the oil O sucked from the suction port 44 into the pump room 46 to the discharge port 45 through between the external gear 42 and the internal gear 43. In this way, the pump 40 is driven through the motor shaft 20a. The oil O discharged from the discharge port 45 flows into the first oil passage 61, and flows from the connection port 61a to the second oil passage 62. As indicated by an arrow in FIG. 4, the oil O flowing into the second oil passage 62 receives radially outside force due to centrifugal force of the rotating motor shaft 20a, and flows to the outside of the motor shaft 20a through the first oil supply holes 26a, 26b and the second oil supply holes 26c, 26d.

In the embodiment, because the first oil supply hole 26a is open to the axial gap 27a between the first end plate 24 and the rotor core 22, the oil O flowing out from the first oil supply hole 26a flows into the gap 27a. The oil O flowing into the gap 27a is exhausted radially outward from the exhaust groove 24a. In the embodiment, because the opening on one side in the axial direction of the radially inside portion of the exhaust groove 24a is closed by the washer 91, the oil O flowing into the exhaust groove 24a is easily guided radially outward by the washer 91.

Because the first oil supply hole 26b is open to the axial gap 27b between the second end plate 25 and the rotor core 22, the oil O flowing out from the first oil supply hole 26b flows into the gap 27b. The oil O flowing into the gap 27b is exhausted radially outward from the exhaust groove 25a. In the embodiment, because the opening on the other side in the axial direction in the radially inside portion of the exhaust groove 25a is closed by the flange 21f, the oil O flowing into the exhaust groove 25a is easily guided radially outward by the flange 21f.

The oil O exhausted radially outward from the exhaust grooves 24a, 25a is blown onto the coil 32. This enables the oil O to cool the coil 32. In the embodiment, the second oil passage 62 is provided in the motor shaft 20a, so that the rotor 20 can also be cooled by the oil O until the oil O is exhausted from the exhaust grooves 24a, 25a. As described above, in the present embodiment, the oil O discharged from the discharge port 45 is guided to the rotor 20 and the stator 30.

Because the second oil supply hole 26c is open to the radial inside of the bearing holder 12e, the oil O flowing out from the second oil supply hole 26c is supplied to the bearing 70. Because the second oil supply hole 26d is open to the radial inside of the bearing holder 11c, the oil O flowing out from the second oil supply hole 26d is supplied to the bearing 71. Consequently, the oil O can be used as a lubricant for the bearings 70, 71.

FIG. 4 illustrates an example in which the oil O is exhausted upward from the exhaust grooves 24a, 25a. However, the present disclosure is not limited to this configuration. Because the rotor 20 rotates, the circumferential positions of the exhaust grooves 24a and 25a change in association with the rotation of the rotor 20. Consequently, the direction of the oil O exhausted from the exhaust grooves 24a, 25a changes to the circumferential direction, and the plurality of coils 32 arranged along the circumferential direction can be cooled by the oil O.

As described above, the pump 40 can be driven by the rotation of the motor shaft 20a, and the oil O stored in the housing 10 can be sucked up by the pump 40, and supplied to the rotor 20, the stator 30, and the bearings 70, 71. Consequently, the rotor 20 and the stator 30 can be cooled using the oil O stored in the housing 10, and lubricity between the bearings 70, 71 and the motor shaft body 21 can be improved. The oil O supplied to the stator 30 and the bearings 70, 71 drops in the accommodation unit 14, and is stored in the lower region in the accommodation unit 14 again. This allows circulation of the oil O in the accommodation unit 14.

In the embodiment, the support unit 13h journals the motor shaft 20a on the radial outside of the motor shaft 20a, and constitutes at least a part of the surface on the other side in the axial direction of the pump room 46 and at least a part of the radially inside surface of the shaft insertion hole 13f. Consequently, the motor shaft 20a can be supported near the pump room 46. Thus, even if the coaxial accuracy between the rotor 20 and the stator 30 is relatively low, the motor shaft 20a can be prevented from tilting with respect to the pump 40, and the motor shaft 20a can axially and accurately be disposed with respect to the pump 40. Consequently, the external gear 42 fixed to the motor shaft 20a can be prevented from being displaced with respect to the internal gear 43 in the pump room 46. For this reason, the external gear 42 can be prevented from being strongly pressed against the internal gear 43, and abrasion of the external gear 42 and the internal gear 43 can be prevented. As described above, in the embodiment, the drive device 1 that can prevent the damage of the pump 40 is obtained.

In the embodiment, because the support unit 13h constitutes at least a part of the surface on the other side in the axial direction of the pump room 46 and at least a part of the radially inside surface of the shaft insertion hole 13f, the oil O in the pump room 46 flows into the shaft insertion hole 13f, and is easily supplied between the support unit 13h and the motor shaft 20a in the radial direction. Consequently, the oil O can be used as a lubricant, and the motor shaft 20a supported by the support unit 13h can smoothly be rotated.

In the embodiment, at least a part of the bush 53 fixed to the motor shaft 20a is radially disposed between the support unit 13h and the motor shaft 20a. For this reason, the bush 53 can more smoothly rotate the motor shaft 20a supported by the support unit 13h. Because the oil O in the pump room 46 flows radially between the support unit 13h and the bush 53, the bush 53 can be more easily slid with respect to the support unit 13h, and the motor shaft 20a can more smoothly be rotated.

In the embodiment, the support 13h has the annular shape surrounding the radial outside of the motor shaft 20a. For this reason, a whole circumference of the motor shaft 20a can be supported by the support unit 13h, and the motor shaft 20a can more stably be supported.

In the embodiment, the support unit 13h journals the mounting member 50. For this reason, the outer diameter of the portion of the motor shaft 20a supported by the support unit 13h can be decreased irrespective of the outer diameter of the motor shaft body 21. Consequently, the inner diameter of the shaft insertion hole 13f is easily decreased, and an amount of oil O leaking from the pump room 46 through the shaft insertion hole 13f can be decreased while the oil O is supplied as the lubricant to the shaft insertion hole 13f. In the case that the bush 53 is provided as in the embodiment, the bush 53 only has to be fixed to the mounting member 50, and the bush 53 is easily mounted.

In the embodiment, the oil O discharged from the discharge port 45 can be sent to the inside of the motor shaft 20a by providing the first oil passage 61 and the second oil passage 62. The first oil supply holes 26a, 26b and the second oil supply holes 26c, 26d are provided, so that the oil O flowing into the second oil passage 62 can be supplied to the stator 30 and the bearings 70, 71.

In the embodiment, the second oil passage 62 provided in the motor shaft 20a is open to the first oil passage 61 connected to the discharge port 45 at the end on one side in the axial direction of the motor shaft 20a. Because the external gear 42 is fixed to the end on one side in the axial direction of the motor shaft 20a, the end on one side in the axial direction of the motor shaft 20a is disposed at a position relatively close to the discharge port 45. Thus, the first oil passage 61 connecting the discharge port 45 and the second oil passage 62 can be shortened. For this reason, in the embodiment, a total length of the oil passage from the opening 12f to the second oil passage 62 is easily shortened. Consequently, the oil O is easily sent to the second oil passage 62 provided in the motor shaft 20a. The structure of the drive device 1 is easily simplified, and the manufacturing of the drive device 1 can be facilitated.

In the embodiment, the second oil passage 62 is formed by axially connecting the inside of the mounting member 50 and the hole 21g, and connected to the first oil passage 61 through the inside of the mounting member 50. For this reason, the oil O can flow from the mounting member 50 into the second oil passage 62 while the external gear 42 is fixed to the mounting member 50. Consequently, as described above, the motor shaft body 21 and the external gear 42 can be fixed with the mounting member 50 interposed therebetween without changing the sizes of the motor shaft body 21 and the external gear 42, and the second oil passage 62 is easily open to the first oil passage 61.

The present disclosure is not limited to the above embodiment, but other configurations may be adopted. The support unit 13h may not have the annular shape. For example, a plurality of support units 13h may be provided at intervals along the circumferential direction. The shape of the support unit 13h is not particularly limited as long as the support unit 13h can journal the motor shaft 20a. The support unit 13h may be provided in the outer lid 13 as a separate member. The whole bush 53 may radially be disposed between the support unit 13h and the motor shaft 20a. The bush 53 may not be provided.

The external gear 42 may directly be fixed to the motor shaft body 21 with no use of the mounting member 50. In this case, for example, the second oil passage 62 may be provided only in the motor shaft body 21. The mounting member 50 may be fixed to the outer circumferential surface of the motor shaft body 21.

The mounting member 50 may be a member having a uniform outer diameter over the whole axial direction. That is, the outer diameter of the fitting unit 51 and the outer diameter of the fixing unit 52 may be identical to each other. In this case, for example, when the outer diameter of the fixing unit 52 is reduced to be equal to the outer diameter of the fitting unit 51 in FIG. 1, the outer diameter of the external gear 42 to which the fixing unit 52 is fixed can be decreased. Consequently, the outer diameter of the internal gear 43 can be decreased, and the inner diameter of the pump room 46 can be decreased. Thus, the outer diameter of the protrusion 13d in which the pump room 46 is provided can be decreased, and a radial gap between the radially outside surface of the protrusion 13d and the inner circumferential surface of the second recess 12g can be increased. For this reason, for example, a portion of the sensor 82 protruding to one side in the axial direction can be disposed between the radially outside surface of the protrusion 13d and the inner circumferential surface of the second recess 12g, and the sensor 82 can be brought closer to the outer lid 13. Consequently, the whole drive device 1 is easily downsized in the axial direction. For example, the portion of the sensor 82 protruding to one side in the axial direction is the coil of the sensor 82.

The mounting member 50 may be constructed with at least two members. In this case, the mounting member 50 may include a first tubular member fitted in the hole 21g, a second tubular member that is fitted in the first tubular member and extends to one side in the axial direction with respect to the motor shaft body 21. In this case, the external gear 42 is fixed to the end on one side in the axial direction of the second tubular member. The motor shaft 20a may not include the mounting member 50, but may be a single member. The motor shaft 20a may not include the second oil passage 62.

The rotor core 22 may be fixed to the outer circumferential surface of the motor shaft body 21 by press fitting or the like. In this case, the first end plate 24 and the second end plate 25 may not be provided. In this case, the oil O flowing out from the first oil supply holes 26a, 26b may directly be supplied to the coil 32, a hole connected to the first oil supply holes 26a, 26b is made in the rotor core 22, and the oil O may be supplied to the coil 32 through the hole of the rotor core 22. The oil O may be supplied to the stator core 31.

A place to which the oil O discharged from the discharge port 45 is supplied is not particularly limited, and the oil O may be supplied to only one or two of the rotor 20, the stator 30, and the bearings 70, 71, or may not be supplied to any. For example, the oil O discharged from the discharge port 45 may be supplied to the inside surface of the upper region in the vertical direction of the accommodation unit 14. In this case, the stator 30 can indirectly be cooled by cooling the housing 10. At least one of the first oil supply holes 26a, 26b and the second oil supply holes 26c, 26d may not be made. The tooth 42a of the external gear 42 and the tooth 43a of the internal gear 43 may have a cycloid tooth shape or an involute tooth shape.

Figure 5:
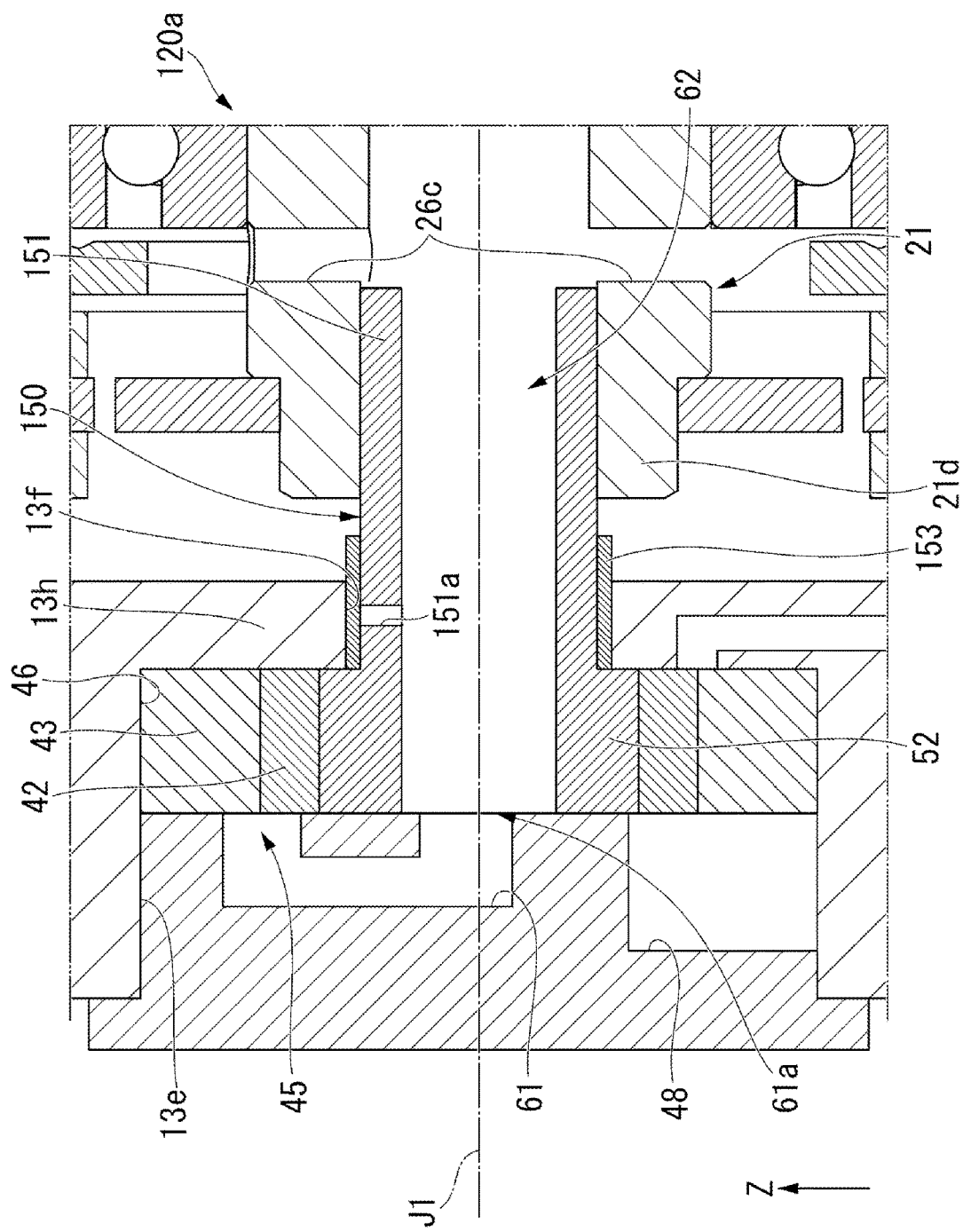
FIG. 5 is a side view of a vehicle on which the drive apparatus according to the first modification is installed.

Similarly to the motor shaft 120a in FIG. 5, the mounting member 150 may include a third oil supply hole 151a. That is, the motor shaft 120a includes the third oil supply hole 151a. In FIG. 5, the third oil supply hole 151a is provided in a fitting unit 151. The third oil supply hole 151a connects the second oil passage 62 and the outer circumferential surface of the motor shaft 120a. The third oil supply hole 151a is open to the outer circumferential surface of the portion of the motor shaft 120a radially opposed to the support unit 13h. Consequently, the third oil supply hole 151a allows the oil O in the second oil passage 62 to be easily supplied to the gap between the support unit 13h and the motor shaft 120a. This enables the motor shaft 120a to be more smoothly rotated.

In the configuration of FIG. 5, the radially outside opening of the third oil supply hole 151a is opposed to a radially inside surface of a bush 153. In this configuration, the bush 153 is made of a porous material, and causes the oil O to pass through the bush 153 in the radial direction. Consequently, the oil O flowing from the second oil passage 62 into the third oil supply hole 151a passes through the bush 153, and is radially supplied to the gap between the bush 153 and the support unit 13h. Thus, the bush 153 can be more easily slid with respect to the support unit 13h, and the motor shaft 120a can more smoothly be rotated. The third oil supply hole 151a corresponds to a second through-hole.

In the case that a place where the bush is not provided exists radially between the motor shaft 120a and the support unit 13h, the third oil supply hole 151a may be open to the outer circumferential surface of the motor shaft 120*a* in the place where the bush is not provided. In this case, the radially outside opening of the third oil supply hole 151*a* is radially opposed to the radially inside end of the support unit 13*h* with a gap interposed therebetween. In this case, the bush 153 may not be made of the porous material.

The application of the drive device of the above embodiment is not particularly limited. For example, the drive device of the embodiments is mounted on a vehicle.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive device comprising:
a rotor including a motor shaft disposed along a center axis extending in one direction and a rotor core fixed to the motor shaft;
a stator radially opposed to the rotor with a gap interposed between the stator and the rotor;
a housing including an accommodation portion to store oil and accommodate the rotor and the stator; and
a pump driven by the motor shaft; wherein
the pump includes:
    an external gear fixed to an end on one side in an axial direction of the motor shaft;
    an internal gear that surrounds a radial outside of the external gear and meshes with the external gear;
    a pump room accommodating the internal gear and the external gear;
    a suction port through which the oil is to be sucked into the pump room; and
    a discharge port through which the oil is to be discharged from the pump room;
the housing includes an outer lid in which the pump room is provided;
the outer lid includes:
    a shaft insertion hole penetrating the outer lid from an axially inner surface of the pump room to an axially inner surface of the outer lid, the motor shaft being inserted into the shaft insertion hole; and
    a support defining at least a portion of the axially inner surface of the pump room and at least a portion of a radially inside surface of the shaft insertion hole; and
the support journals the motor shaft on a radial outside of the motor shaft.

2. The drive device according to claim 1, wherein
the housing includes a first oil passage connected to the discharge port; and
the motor shaft includes:
    a second oil passage located in the motor shaft and connected to the first oil passage; and
    a first through-hole that connects the second oil passage and an outer circumferential surface of the motor shaft and is connected to an inside of the accommodation portion.

3. The drive device according to claim 2, wherein
the motor shaft includes a second through-hole connecting the second oil passage and the outer circumferential surface of the motor shaft; and
the second through-hole is open to an outer circumferential surface of a portion of the motor shaft radially opposed to the support.

4. The drive device according to claim 2, wherein the motor shaft includes:
a motor shaft body to which the rotor core is fixed; and
a mount fixed to one side in the axial direction of the motor shaft body, the external gear being fixed to the mount; and
the support journals the mount.

5. The drive device according to claim 4, wherein
the motor shaft body includes a hole extending from an end on a first side in the axial direction of the motor shaft body toward a second side in the axial direction;
the mount is fitted in and fixed to the hole, and has a tubular shape that is open to both axial sides; and
the second oil passage includes a portion axially connecting an inside of the mount and the hole, and is connected to the first oil passage through the inside of the mount.

6. The drive device according to claim 1, wherein
the rotor includes a cylindrical bush fitted in and fixed to the motor shaft; and
at least a portion of the bush is radially disposed between the support and the motor shaft.

7. The drive device according to claim 1, wherein the support has an annular shape surrounding the radial outside of the motor shaft.

8. The drive device according to claim 1, wherein a portion of the motor shaft to which the external gear is fixed is an increased diameter portion in which an outer diameter is increased from an axially inner side of the motor shaft toward an axially outer side of the motor shaft, and the portion of the motor shaft is opposed to one side in the axial direction of the support.

9. The drive device according to claim 8, wherein a gap is axially provided between the increased diameter portion and the support.

* * * * *